United States Patent [19]
Kalmanczhelyi et al.

[11] 4,402,336
[45] Sep. 6, 1983

[54] HYDRAULIC FLOW DIVIDING AND INTEGRATING EQUIPMENT

[75] Inventors: Gábor Kálmánczhelyi; Pál Kiss, both of Budapest, Hungary

[73] Assignee: Danuvia Kozponti Szerszam es Keszulekgyar, Budapest, Hungary

[21] Appl. No.: 261,614

[22] Filed: May 7, 1981

[30] Foreign Application Priority Data

May 12, 1980 [HU] Hungary ............................ 1164/80

[51] Int. Cl.[3] ........................................ G05D 11/03
[52] U.S. Cl. .................................. 137/101; 137/111; 137/118
[58] Field of Search ........................ 137/101, 111, 118

[56] References Cited

U.S. PATENT DOCUMENTS 2,956,577 10/1960 Kirkham ............................ 137/101
3,240,231 3/1966 Cadiou .......................... 137/625.67
3,752,176 8/1973 King .................................. 137/118
4,231,441 11/1980 Burckhardt ..................... 137/101 X

FOREIGN PATENT DOCUMENTS 45-12190 2/1970 Japan .................................. 137/101
198865 8/1967 U.S.S.R. ............................. 137/101

*Primary Examiner*—Gerald A. Michalsky
*Attorney, Agent, or Firm*—Young & Thompson

[57] ABSTRACT

The invention relates to hydraulic flow dividing and integrating equipment, having a regulating slide valve in its flow path and calibrated throttlings in an admission channel of the flow path. The calibrated throttlings are adjustable as a function of entering liquid flow. Mobile rings are arranged on the regulating slide valve. With these simple technical arrangements, the field of application of hydraulic systems, e.g. for gear synchronization, is considerably enlarged.

3 Claims, 4 Drawing Figures

HYDRAULIC FLOW DIVIDING AND INTEGRATING EQUIPMENT

The invention relates to hydraulic flow dividing and integrating equipment having a regulating slide valve in its flow path and calibrated throttlings in an admission channel of the flow path.

Flow dividing and integrating equipment is applied in several hydraulic systems, wherein plural hydraulic working devices with a certain relationship to each other are operated from one hydraulic source. That is the situation in the case of synchronizing two hydraulic working cylinders, one of which may be more or less loaded than the other. The entering flow of liquid will be divided independently of the load, or in the case of integrating operation, if the separate flows of liquid will be summed, in both cases, the speed relationship of the working devices will be kept unchanged.

A typical field of use is the synchronization of hydraulic gear drive. The equipment may be provided with auxiliary elements for providing the function of differential lock at the same time. In the latter case, synchronous operation must be excluded.

The known hydraulic flow dividing and/or integrating equipment works according to the throttle principle. In the flow path, a regulating slide valve and in the admission channel constant calibrated throttlings are built. If the working devices are loaded uniformly, the same amount of liquid passes through the calibrated throttlings, thus, the drops in pressure are the same there, too, on the end surfaces of the regulating slide valve are applied uniform forces, the openings at the control edges have uniform cross sections.

If the working devices at the exit of the equipment are not loaded uniformly, the pressure drops at the calibrated throttlings are not the same. This pressure difference on the end surfaces of the regulating slide valve causes it to move in the direction of lower pressure. Thus, an auxiliary throttling is effected at one of the control edges. In this way, the initial state in the speed relations of the exits will be maintained.

The accuracy of flow dividing and integrating devices according to the throttle principle is influenced considerably by the frictional forces borne by the regulating slide valve. The accuracy of control will be increased with increasing flow amount passing through the equipment. For a given value of accuracy, a given minimal quantity of flow is required. However, the greater is the quantity of flow through the throttlings, the greater are the resistance of throttlings, the energy wastes, and the heating-up of the liquid. Thus, the maximum quantity of flow is limited, too. The coverage defined as a quotient of the maximum discharge limited by the drop in pressure and of the minimum discharge limited by the accuracy is about 3 in the case of the known devices.

In hydraulic systems, gears are used in many applications. In these cases, e.g. for gear drives, the relatively small coverage of the known devices given above is a very disadvantageous feature, since a coverage of 15 to 20 is needed.

The main object of our invention is to provide hydraulic flow dividing and integrating equipment, with which all functions of the known devices can be fulfilled with a simpler construction, and a greater quantity of flow can be treated, whereby the equipment has a remarkably greater coverage.

The basic idea of the invention is on the one hand, that the drop in pressure should little increase with the increase in quantity of flow and, on the other hand, that for the function as dividing and integrating equipment not only two, but four control edges should be provided.

The invention relates to hydraulic flow dividing and integrating equipment having a regulating slide valve in its flow path and calibrated throttlings in an admission channel of the flow path. The calibrated throttlings are adjustable as a function of entering liquid flow and mobile rings are arranged on said regulating slide valve.

The importance of these technical measures is that the quantity of flow, thus the pressure drop are adjustable, or rather adjust themselves with the help of the adjustable calibrated throttlings from practically zero to a relatively high value and that the mobile rings provide a very simple solution for equipment that functions as dividing and at the same time as integrating equipment.

Other objects and details of the invention will be described hereinafter in connection with exemplified embodiments with reference to the attached drawings. In the drawings, FIG. 1 is a schematic cross section of a known solution.

Figure 1:
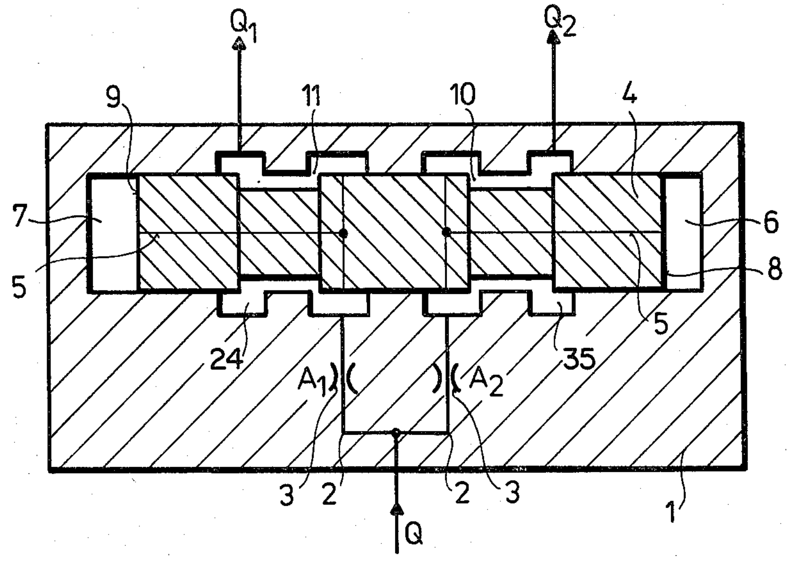
Fig. 1 PRIOR ART

The embodiment of the hydraulic flow dividing equipment shown in FIG. 1 is a known device and is composed of a housing 1 in which the various channels, spaces, chambers and ducts are provided. The entering liquid flow is indicated in FIG. 1 with Q, which is conducted into an admission channel 2. The admission channel 2 is divided into two branches, each of them provided with calibrated throttlings 3 with constant cross sections $A_1$ and $A_2$. The branches of admission channel 2 are conducted in a closed space formed in the housing 1. Into this closed space, a regulating slide valve 4 is placed dividing the closed space into four separate chambers. Each branch of admission channel 2 is led to separate chambers 24 and 35. The regulating slide valve 4 is shorter than the closed space in housing 1, thus there are chambers 6 and 7 left at end surfaces 8 and 9 of the regulating slide valve. These chambers 6 and 7 are connected to chambers 24 and 35, respectively, through borings 5 provided in the regulating slide valve 4. Exit flows of the equipment are indicated with $Q_1$ and $Q_2$, respectively.

As mentioned in the introduction, if the exits $Q_1$ and $Q_2$ are nonuniformly loaded, different pressure drops will arise at calibrated throttlings 3, thus, the pressure will not be the same in chambers 24 and 35. This pressure difference will be conducted via borings 5 into the chambers 6 and 7, respectively. As a result, a force will be applied on one of end surfaces 8 or 9 which is different than the force applied on the other end surface. The regulating slide valve 4 will move in the direction of that chamber 6 or 7, where there is a lower pressure. If in chamber 6 is a higher pressure than in chamber 7, the regulating slide valve 4 will move to the left, thus a control edge 11 between regulating slide valve 4 and housing 1 will be smaller in cross section than a control edge 10 between the valve 4 and the housing 1 in chamber 35. In this case, a greater quantity of flow will pass control edge 10 than control edge 11, whereby the nonuniform load of exits $Q_1$ and $Q_2$ will be equalized.

The device, shown in FIG. 1 can be operated only as a dividing equipment. According to the state of the art, it is completed with auxiliary elements, e.g. with an articulated slide valve for being operable as dividing and at the same time as integrating equipment. These elements are usually very complicated and they are an extra source of inaccuracy. For the sake of better understandability, they are not shown in FIG. 1.

Figure 2:
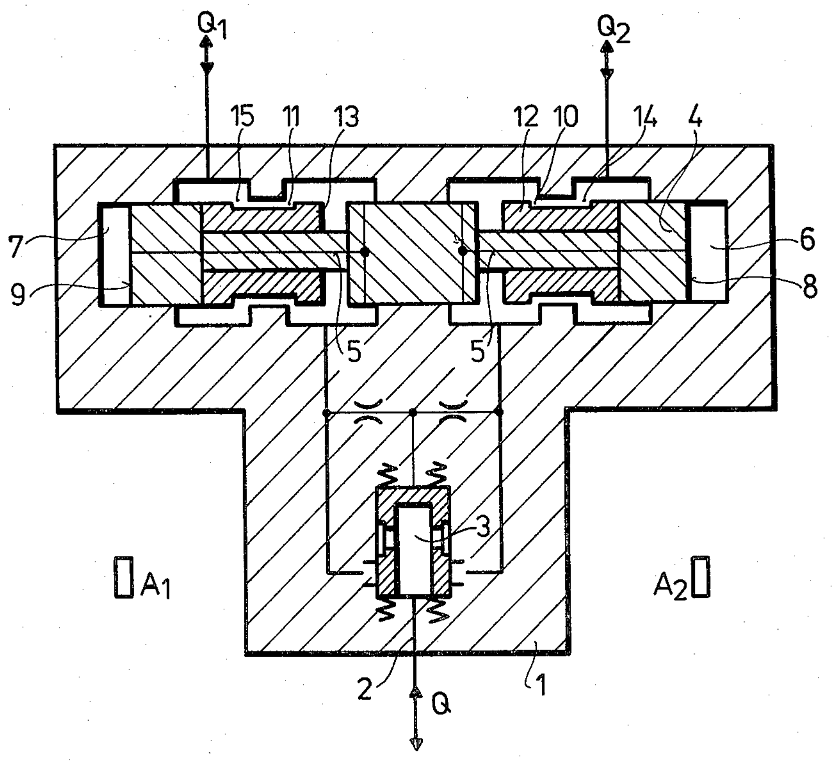
FIG. 2 illustrates a schematic cross section of one of the embodiments of our invention.

In FIG. 2 is shown an exemplified embodiment of the hydraulic flow dividing and integrating equipment as in our invention. In comparison with FIG. 1, the calibrated throttlings 3 are here adjustable, furthermore, mobile rings 12 and 13 are arranged on regulating slide valve 4. This equipment can serve as dividing and at the same time as integrating equipment.

Figure 3:
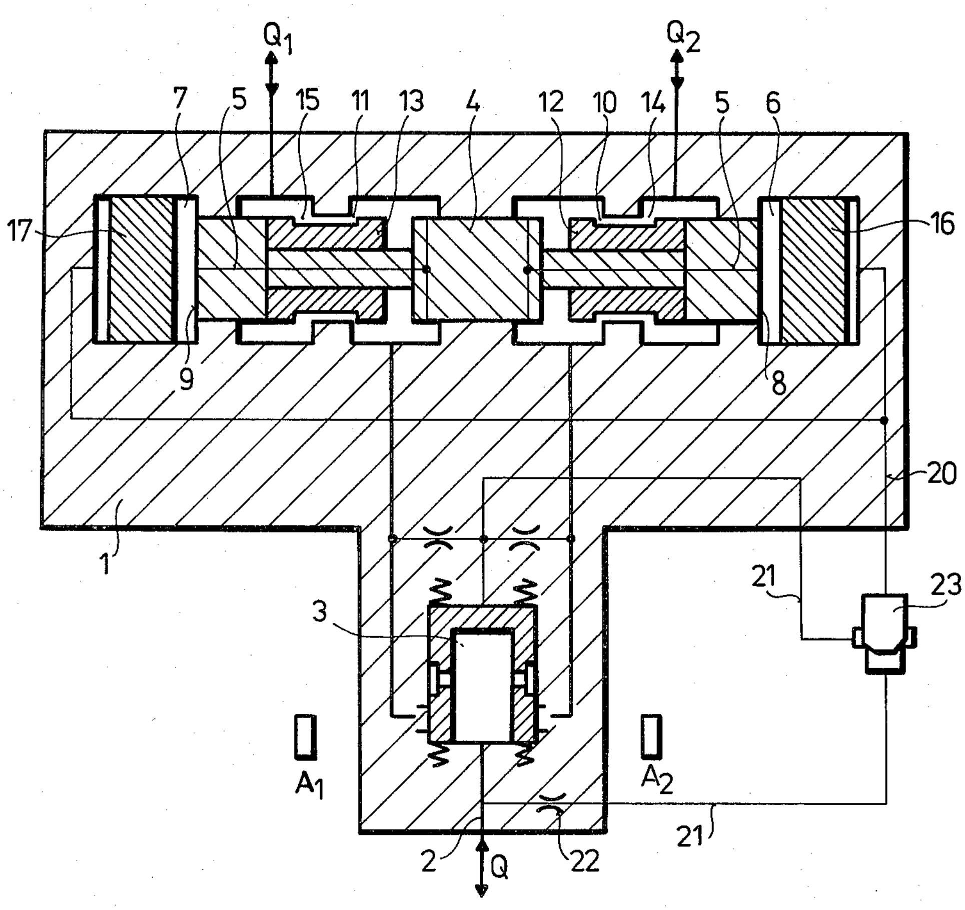
FIG. 3 shows the cross section of another embodiment in this invention and finally

In FIG. 3, a more complete device is shown which is not only a dividing and integrating equipment but at the same time a differential lock, too. The closed space in housing 1 is at chambers 6 and 7 longer and has a greater diameter, thus chambers 6 and 7 are enlarged. In these enlarged chambers 6 and 7, control pistons 16 and 17 are arranged, respectively. In the housing 1, a pilot duct 20 is provided which flows into chambers 6 and 7 behind control pistons 16 and 17, respectively. The other end of pilot duct 20 is connected to a valve 23. On the other hand, valve 23 controls a by-pass 21, too, which starts from admission channel 2 before calibrated throttlings 3 and flows into the admission channel 2 after dividing into two branches behind calibrated throttlings 3. In this way, calibrated throttlings 3 can be circumvented, i.e. released, if their control function is not desired but a great quantity of flow is required. This is the situation in the case of differential lock.

Figure 4:
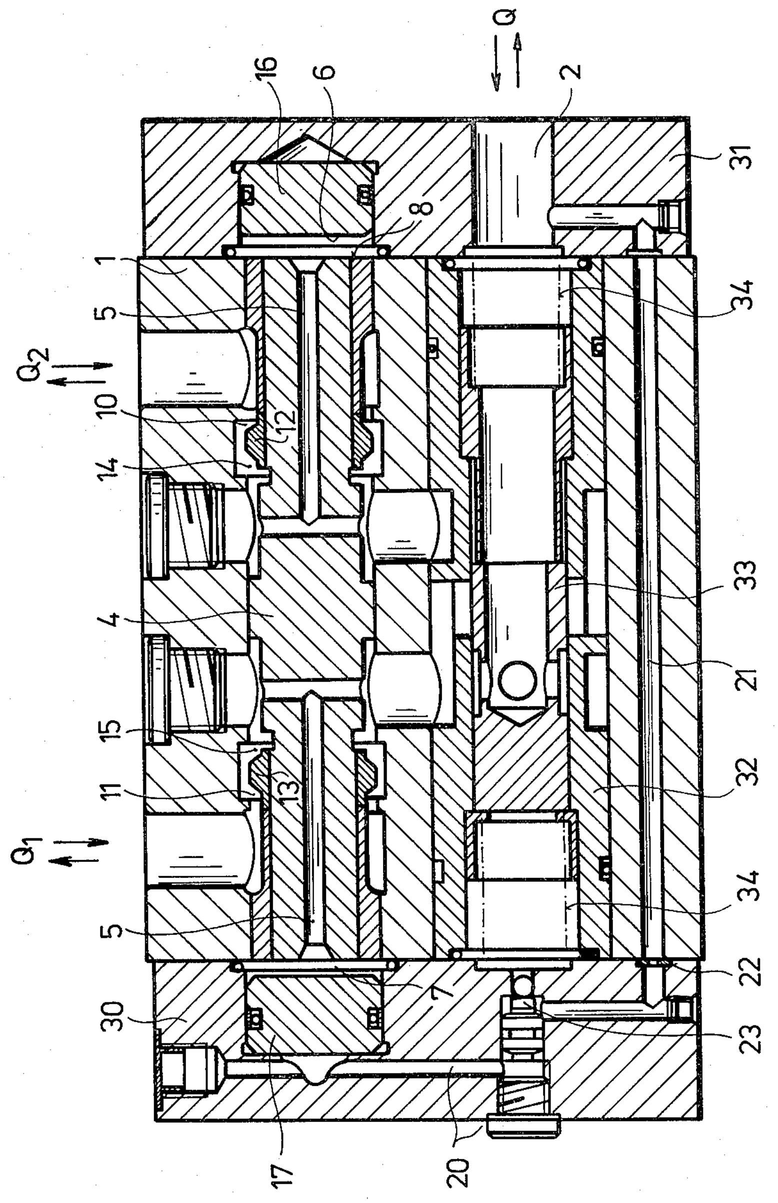
FIG. 4 is a working plan of a cross section of the embodiment shown in FIG. 3.

FIG. 4 shows a cross section of the working plan of an actual embodiment.

The calibrated throttlings are assembled here from a sleeve 32 and a slide 33 cooperating with sleeve 32. The calibrated throttlings 3 are "prestressed", biased with a spring 34 attached to sleeve 32 on one side and another spring 34 connected to slide 33 on the other side.

This lay-out of calibrated throttlings 3 has the importance, that only sleeve 32 is to be replaced for changing the relation of calibrated throttlings 3 and in this way, of flow division and integration. On the other hand, with springs 34 the minimum required pressure drop can be adjusted on throttlings 3. Thanks to the "prestressed" throttlings 3, the throttle opening and thus, the liquid flow can be almost zero.

With increasing quantity of flow, adjustable calibrated sleeve slide 33 biased by springs 34 will move to the left in FIG. 4, thus, the openings of calibrated throttlings 3 will be greater, and the drop in pressure increases here by only a small value. The field of operation will be greatly enlarged, since large volumes of liquid can be treated here, coverages can be produced which exceed by far the values of 15 to 20 needed for gear drives.

Valve 23 is formed in FIG. 4 as a non-return valve which can be controlled from outside through pilot duct 20.

The function of the hydraulic flow dividing and integrating equipment according to our invention will be described hereinafter with reference to FIG. 4.

The function as dividing equipment was discussed in detail in connection with FIG. 1. Entry liquid flow is shown by Q (upper arrow) and exit flows by $Q_1$ and $Q_2$ (left arrow), respectively. The different pressures at calibrated throttlings 3 are led from chamber 24 through boring 5 provided in regulating slide valve 4 to chamber 7 and from chamber 35 through the other boring 5 to chamber 6. The pressures are effective there not only on end surfaces 8 and 9 of regulating slide valve 4, but on rings 12 and 13, too. These rings 12 and 13 will be moved because of the difference in pressures in chamber 6 and 7, respectively. In this way, control edges 10 and 11 are provided between rings 12 and 13 and housing 1, respectively.

If the equipment is to be operated as an integrating device, the direction of liquid flow will be reversed. Thus, $Q_1$ and $Q_2$ are entry flows (right arrows) and Q exit flow (lower arrow). Entering flow $Q_1$ moves ring 13 to the right in FIG. 4 and entering flow $Q_2$ moves ring 12 to the left, thus, control edges 15 and 14, respectively, are provided between rings 13 and 12 and housing 1. The operation is nearly the same as in the case of division with the exception that the additional throttlings are provided at control edges 14 and 15.

In the case of differential lock, the synchronization function must be prohibited. This is caused by control pistons 16 and 17. When the function as differential lock is desired, a pilot pressure is led through pilot duct 20 to chambers 6 and 7, respectively, behind control pistons 16 and 17. The control pistons 16 and 17 will move thereupon in the direction of end surfaces 8 and 9 and will fix the regulating slide valve 4 in a position, wherein the adjustable openings, especially at control edges 10, 11 and 14, 15, have the greatest cross sectional area. But the pilot pressure is effective for non-return valve 23, too, which will be opened, thus, the pressure on both sides of calibrated throttlings 3 will be the same, they will be biased by springs 34 in a position, wherein the throttlings are the most widely open. In this way, the synchronization is not effective, and the flow resistance of the equipment is minimal, a great quantity of flow can be transmitted without considerable waste.

As is clearly apparent from what has been said hereinabove, the equipment in our invention is adapted with a very simple construction for flow dividing and at the same time for flow integration without any switching or changing over. If the direction of flow is reversed (entries $Q_1$ and $Q_2$), the equipment will automatically act as a flow integrating device. For the function as a differential lock, only the pilot pressure should be applied, and upon releasing this pilot pressure, the equipment will operate in a mode which is described by the actual direction of flow.

What we claim is:

1. In hydraulic flow dividing and integrating equipment comprising a valve body, a slide valve slidable in the valve body and dividing the valve body into two first chambers through which the slide valve passes, two passageways communicating with spaced portions of each of said first chambers, throttle means in some of said passageways and two second chambers disposed one at each end of the slide valve, each said first chamber communicating with its adjacent said second chamber; the improvement comprising rings slidable on the slide valve in each of said chambers, said rings being disposed between the said two passages that communicate with each of said chambers, the interior of each of the chambers having edges thereon coacting with edges on the rings whereby movement of the rings relative to the slide valve changes the spacing of said edges thereby automatically changing the cross section of the fluid path between the said two passages in each chamber, and a bypass (21) with throttle means (22) therein and a nonreturn valve (23) for bypassing the firstmentioned throttle means (3).

2. Equipment as claimed in claim 1, two of said passages communicating with a single passage, said throttle means controlling the flow through said two passages.

3. Equipment as claimed in claim 2, said throttle means comprising a sleeve and a slide slidable in said sleeve.

* * * * *